United States Patent [19]

Watanabe et al.

[11] Patent Number: 5,675,641
[45] Date of Patent: Oct. 7, 1997

[54] DUAL-MODE SPEAKER TELEPHONE

[75] Inventors: Ken-ichi Watanabe, Santa Clara; Norifumi Yoshida, San Jose, both of Calif.

[73] Assignees: Sony Corporation, Tokyo, Japan; Sony Electronics, Inc., Park Ridge, N.J.

[21] Appl. No.: 643,507

[22] Filed: May 6, 1996

[51] Int. Cl.$^6$ .................. H04M 1/00; H04M 9/00
[52] U.S. Cl. .................. 379/388; 379/389; 379/391; 379/420; 379/430
[58] Field of Search .................. 379/388, 389, 379/390, 391, 402, 406, 410, 420, 432, 387, 395, 430

[56] References Cited

U.S. PATENT DOCUMENTS

| | | | |
|---|---|---|---|
| 4,912,758 | 3/1990 | Arbel | 379/388 |
| 5,263,083 | 11/1993 | Rust et al. | 379/388 |
| 5,349,635 | 9/1994 | Scott | 379/93 |
| 5,396,486 | 3/1995 | Scott | 370/296 |
| 5,448,637 | 9/1995 | Yamaguchi et al. | 379/430 |
| 5,450,618 | 9/1995 | Naddell et al. | 379/420 |
| 5,488,657 | 1/1996 | Lynn et al. | 379/365 |
| 5,504,812 | 4/1996 | Vangarde | 379/430 |

*Primary Examiner*—Krista M. Zele
*Assistant Examiner*—Jacques M. Saint-Surin
*Attorney, Agent, or Firm*—Blakely, Sokoloff, Taylor & Zafman

[57] ABSTRACT

An apparatus and method for operating a speaker telephone in either full-duplex mode or half-duplex mode. In the absence of an earphone connection, the speaker telephone operates in half-duplex mode to prevent undesired feedback of speaker output to microphone input. Upon detecting insertion of an earphone plug into an earphone jack, the speaker telephone transitions to a full-duplex mode of operation. Upon detecting removal of the earphone plug, the speaker telephone reverts to the half-duplex mode of operation. The speaker telephone includes a controller configured to detect an earphone insertion event and enable full-duplex operation in response. The controller enables half-duplex operation upon detecting earphone removal.

11 Claims, 4 Drawing Sheets

DUAL-MODE SPEAKER TELEPHONE

BACKGROUND OF THE INVENTION

(1) Field of the Invention

The present invention relates to the field-of telephony. More specifically, the present invention relates to a method and apparatus for switching a speaker telephone from half-duplex mode to full-duplex mode upon detecting an earphone connection.

(2) Art Background

Speaker telephones are well known in the art and typically include a speaker, microphone and telephone line terminal. Audible input, such has human voice, is converted to an electrical signal by the microphone and transmitted across a telephone line coupled to the telephone line terminal. Conversely, electrical signals received from the telephone line coupled to the telephone line terminal are converted to audible output by the speaker.

Many speaker telephones operate in half-duplex mode. In half-duplex mode, a speaker telephone either transmits signals input from the microphone or produces audible output from signals received at the telephone line terminal, but does not do both simultaneously. The reason for operating in half-duplex mode is the close proximity of the speaker and microphone on a typical speaker telephone. If transmission of signals transduced by the microphone is contemporaneous with audible output on the speaker, the speaker output feeds back into the microphone and ultimately the remote telephone. Such feedback is undesirable and results in a sound-effect referred to as "howling" at the remote telephone. By limiting operation to half-duplex mode, speaker telephones avoid undesirable howling.

When operated in full-duplex mode, a speaker telephone user is able to speak and hear at the same time. This is desirable because it allows speaker telephone communication to more closely resemble a face-to-face conversation. Full-duplex operation in prior-art speaker telephones has generally been accomplished by mechanical separation of speaker and microphone to prevent feedback or by filtering the microphone input to attenuate the signal component resulting from the speaker feedback. However, in many modern electronic devices such as personal digital assistants (PDAs), the need for compact physical design precludes mechanical separation of speaker and microphone, and the processing power required for signal filtering adds considerable cost to the final product. The present invention avoids the need for signal filtering and specially adapted mechanical arrangement by allowing a speaker telephone to automatically switch between full-duplex and half-duplex modes of operation depending on whether an earphone is connected.

SUMMARY OF THE INVENTION

A speaker telephone and a method for operating a speaker telephone capable of switching between half-duplex and full-duplex modes of operation are disclosed. The speaker telephone of the present invention includes a controller which determines whether an earphone is connected or disconnected. If the earphone is disconnected, the controller places the speaker telephone in the half-duplex mode of operation to prevent undesired feedback of speaker output to the microphone input. If the earphone is connected, the controller causes the speaker telephone to transition from the half-duplex to the full-duplex mode of operation.

BRIEF DESCRIPTION OF THE DRAWINGS

The objects, features and advantages of the present invention will be more fully understood by reference to the accompanying drawings, in which.

DETAILED DESCRIPTION OF THE INVENTION

Figure 1:
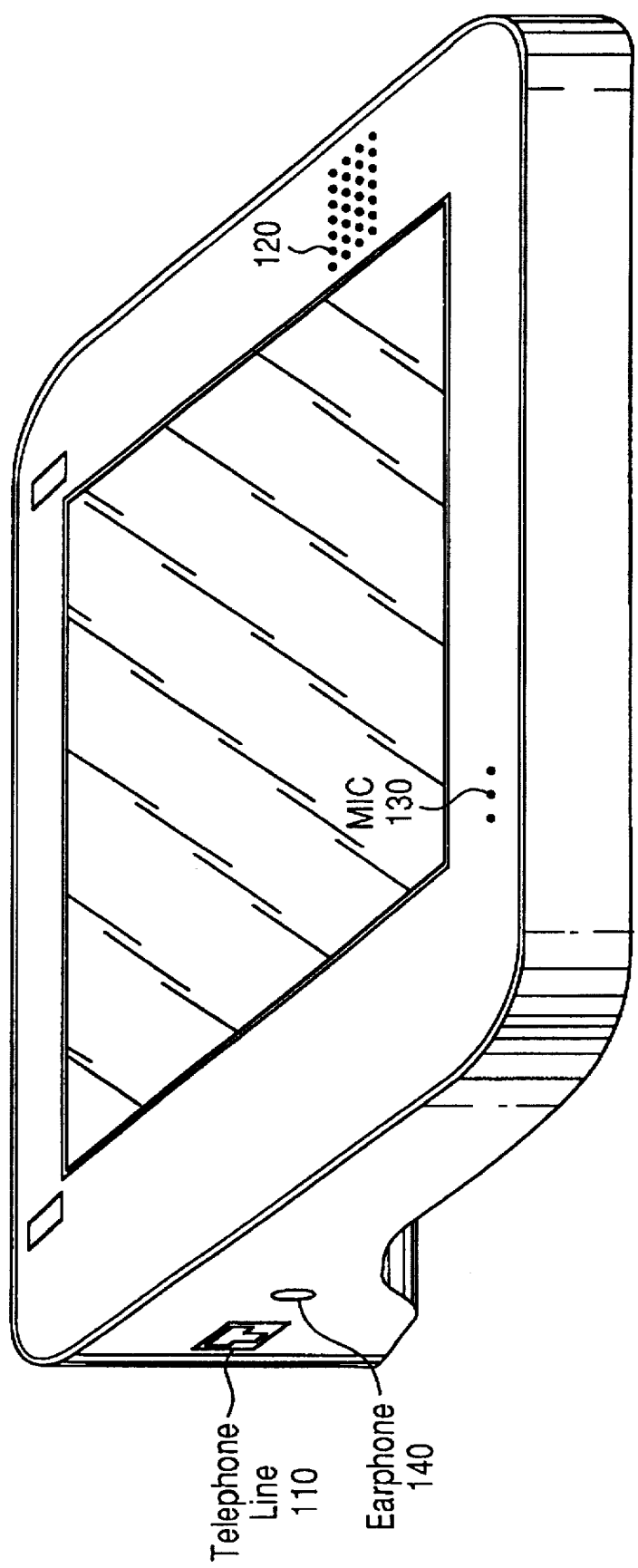
FIG. 1 illustrates a personal digital assistant incorporating a speaker telephone having an earphone jack.

FIG. 1 illustrates a personal digital assistant (PDA) incorporating a speaker telephone of the present invention. As a telephone handset is not typically included in a PDA, a combination of a speaker and microphone is incorporated into the housing of the PDA for easy access and use by the PDA operator. An example of a PDA is the MagicLink® personal digital assistant marketed by Sony Corporation. Referring to FIG. 1, the speaker telephone includes a speaker 120, microphone 130, telephone line terminal 110 and earphone jack 140. In order to prevent howling, the speaker telephone is ordinarily operated in the half-duplex mode. In the half-duplex mode, telephone transmission via the microphone 130 and telephone reception via the speaker 120 are both possible, but not simultaneously. Herein, telephone transmission refers to the act of transmitting an electrical representation of an audible input signal on a telephone line, and telephone reception refers to the act of producing audible output from electrical signals received from the telephone line. Upon sensing a connection of an earphone at the earphone jack 140, the speaker telephone automatically transitions to the full-duplex mode of operation. In the full-duplex mode, telephone transmission via the microphone and reception via an earphone can occur simultaneously. Since the earphone output is relatively low volume and is physically isolated from the microphone, no significant feedback from earphone to microphone occurs, and howling is prevented. If the earphone is removed from the jack, the speaker telephone automatically reverts to half-duplex mode.

Figure 2:
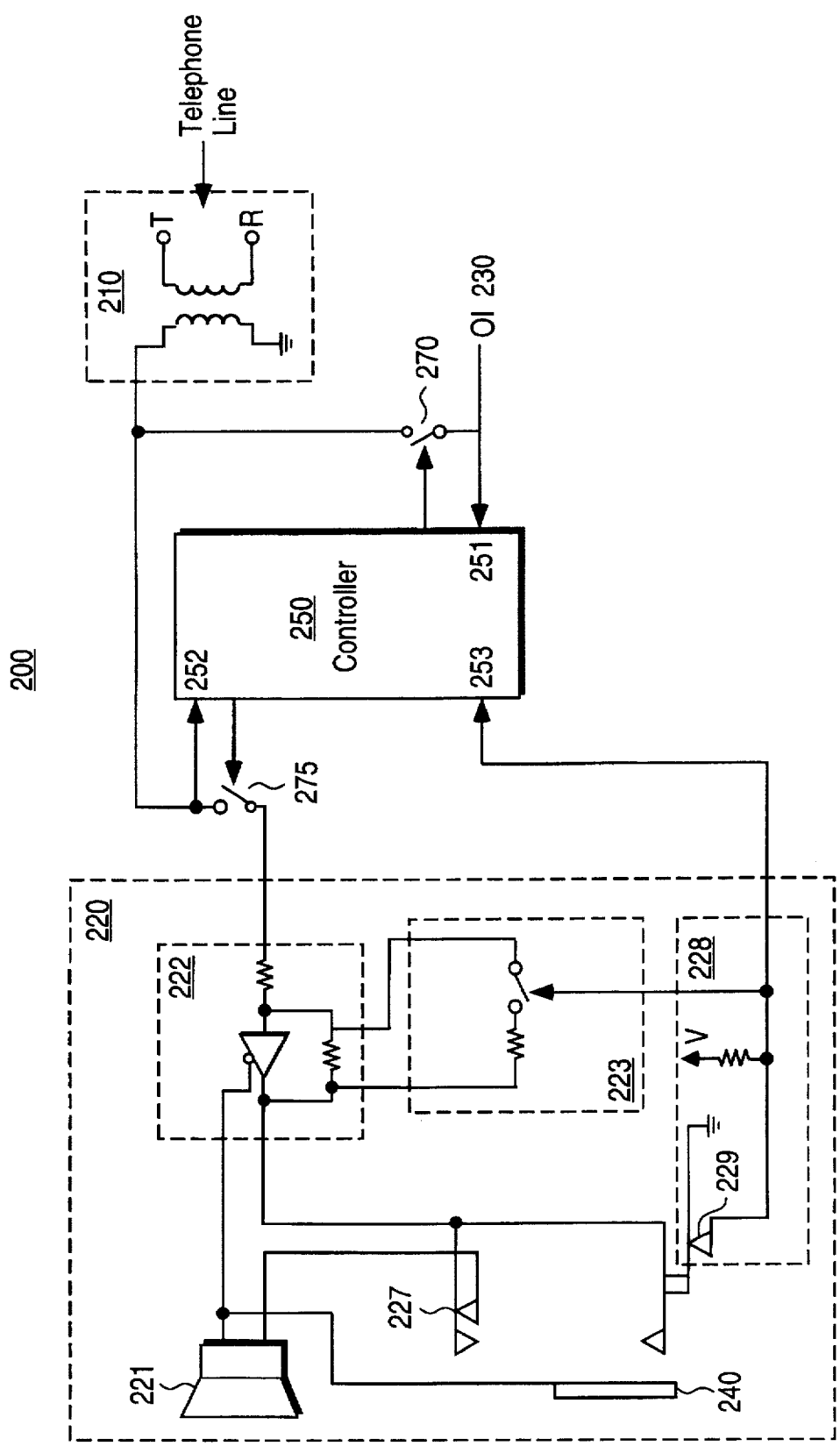
FIG. 2 illustrates a circuit diagram representing a first embodiment of the present invention.

FIG. 2 depicts a circuit diagram 200 representing one embodiment of the present invention. The circuit includes four primary components: a controller 250, a telephone line terminal 210 for receiving a telephone line, a microphone 230 and a speaker circuit 220.

The controller 250 sets the operating state of the speaker telephone based on the previous operating state and the status of one or more of three controller inputs: a microphone input 251, a telephone line terminal input 252, and an earphone detector input 253. The earphone detector input 253 is coupled to an earphone detector 228, which indicates the connection or disconnection of an earphone. The microphone 230 and the telephone line terminal 210 are coupled to the controller 250 at the microphone input 251 and the telephone line terminal input 252, respectively.

The controller 250 couples or decouples the microphone 230 and the telephone line terminal 210 to respectively enable or disable telephone transmission. Similarly, the controller 250 couples or decouples the telephone line terminal 210 and the speaker circuit 220 to enable or disable telephone reception. In the speaker telephone embodiment depicted in circuit diagram 200, switches are used to perform the coupling/decoupling function. The type of switches used, which are controlled by controller 250, are well known to those skilled in the art. A switch 270 is closed or opened by the controller 250 to couple or decouple, respectively, the microphone 230 and the telephone line terminal 210.

Another switch 275 is closed or opened by the controller to couple and decouple, respectively, the telephone line terminal 210 and the speaker circuit 220.

The speaker circuit 220 includes an amplifier 222, a speaker 221, a switch 227, an earphone jack 240, volume control 223 and an earphone detector 228. The amplifier 222 produces an amplified output of signals received from the telephone line terminal 210. If no earphone is connected, the amplified output drives the speaker 221, producing audible output. When the plug of an earphone (not shown) is inserted into the earphone jack 240, a switch 227 is opened, decoupling the amplifier 222 from the speaker 221. By virtue of the contact between the plug of the earphone and the earphone jack 240 (an earphone connection), the output of amplifier 222 is supplied to the earphone to produce audible output. It will be appreciated a number of mechanisms may be employed to re-route the amplifier output from the speaker 221 to earphone jack 240 (and ultimately the earphone). For example, upon detecting insertion of an earphone plug into the earphone jack 240, electronic switching could be used to divert the output of the amplifier to from the speaker 221 to the earphone jack 240.

Connection of the earphone at earphone jack 240 is detected by the earphone detector 228. In the embodiment represented by circuit diagram 200, the earphone detector 228 includes earphone detect switch 229 which is actuated by insertion of an earphone plug into the earphone jack 240, thereby indicating connection of the earphone. It will be appreciated that a variety of sensor mechanisms may be employed to detect insertion of an earphone plug. The earphone detector 228 is coupled to earphone detect input 253 of controller 250, providing the controller 250 with either a connect signal or a disconnect signal depending on whether the earphone plug is inserted into the earphone jack 240. The earphone detector 228 is also coupled to a volume control circuit 223 within the speaker circuit 220. The volume control circuit, responsive to whether the earphone sensor indicates connection of an earphone, controls the amplification of electrical signals received from telephone line terminal 210 by amplifier 222. If an earphone connection is detected, the volume control circuit 223 attenuates the output of the amplifier 222 so as to prevent overdriving the earphone speaker.

Figure 3:
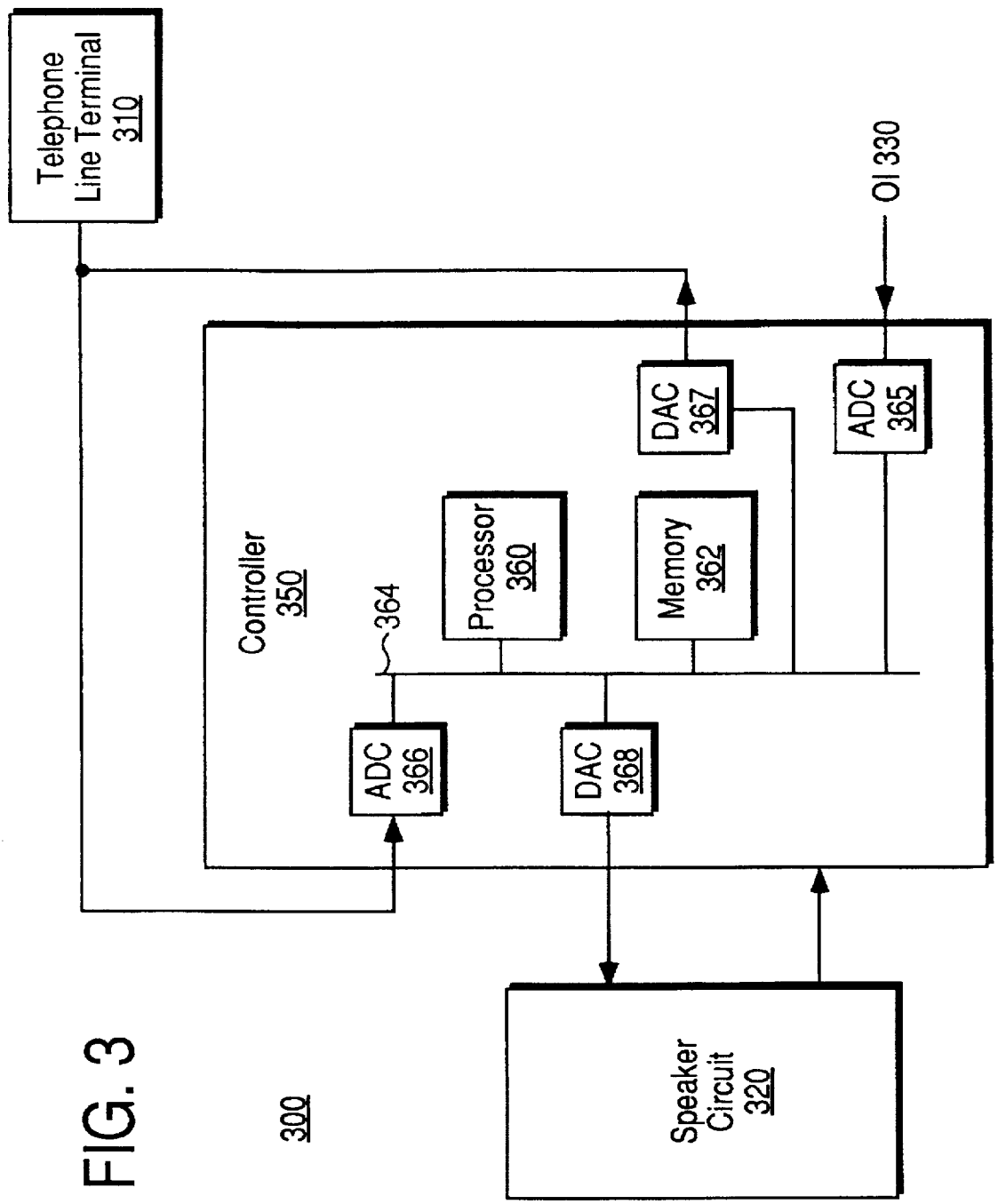
FIG. 3 illustrates a circuit diagram representing a second embodiment of the present invention.

FIG. 3 illustrates a circuit diagram 300 representing an alternate embodiment of the present invention. Circuit diagram 300 includes similar primary elements as circuit diagram 200 (i.e., controller, microphone, speaker circuit 320 and telephone line terminal), but the switches 270 and 275 of circuit diagram 200 have been removed, and the coupling and decoupling function is performed instead by processor switching within the controller 350. Several components of the controller 350 are depicted in circuit diagram 300 to illustrate the manner in which processor switching occurs. These include analog-to-digital converters (ADCs) 365 and 366, digital-to-analog converters (DACs) 367 and 368, a processor 360 and a memory 362, all intercoupled by a bus 364. It will be appreciated that, while these components are described and illustrated as residing within the controller, the individual components may also reside outside the controller 350. Also, while the memory 362 is not itself part of the signal path which is coupled and decoupled by processor switching, the memory 362 may contain instructions and data used by the processor 360 to perform controller functions, including processor switching.

If a signal is received from the telephone line terminal 310, it is digitized by the ADC 366 and read by the processor 360 via the bus 364. If the speaker telephone is in an operating state wherein telephone reception is enabled, the processor 360 writes a version of the digitized signal to the DAC 368 which restores the signal to analog form. The output of the DAC 368 feeds speaker circuit 320 which produces audible output therefrom. Similarly, if a signal is received from the microphone 330, it is digitized by the ADC 365 and read by the processor 360 via the bus 364. If the speaker telephone is in an operating state wherein telephone transmission is enabled, the processor 360 writes a version of the digitized signal to the DAC 367 which restores the signal to analog form. The output of DAC 367 is coupled to the telephone line terminal 310, allowing transmission of the signal on the telephone line.

It will be appreciated by those skilled in the art that before writing a signal to the DACs (367 and 368), the processor 360 may first process the signal (to filter noise, for example) so that the signal out-put by the processor 360 is not necessarily an exact reproduction of the signal received by the processor 360. It will further be appreciated that a number of permutations between the processor switching embodiment of FIG. 3 and the discrete switching embodiment of FIG. 2 are possible. For example, an embodiment might employ processor switching to couple and decouple the microphone 330 and the telephone line terminal 310, but a discrete switch (such as switch 275 of FIG. 2) to couple and decouple the telephone line terminal 310 and speaker circuit 320. Alternatively, an embodiment might employ a discrete switch (such as switch 270 of FIG. 2) to couple and decouple the microphone 330 and the telephone line terminal 310, but processor switching to couple and decouple the telephone line terminal 310 and speaker circuit 320. Furthermore, an embodiment might employ both discrete and processor switching to couple and &couple each signal path.

Figure 4:
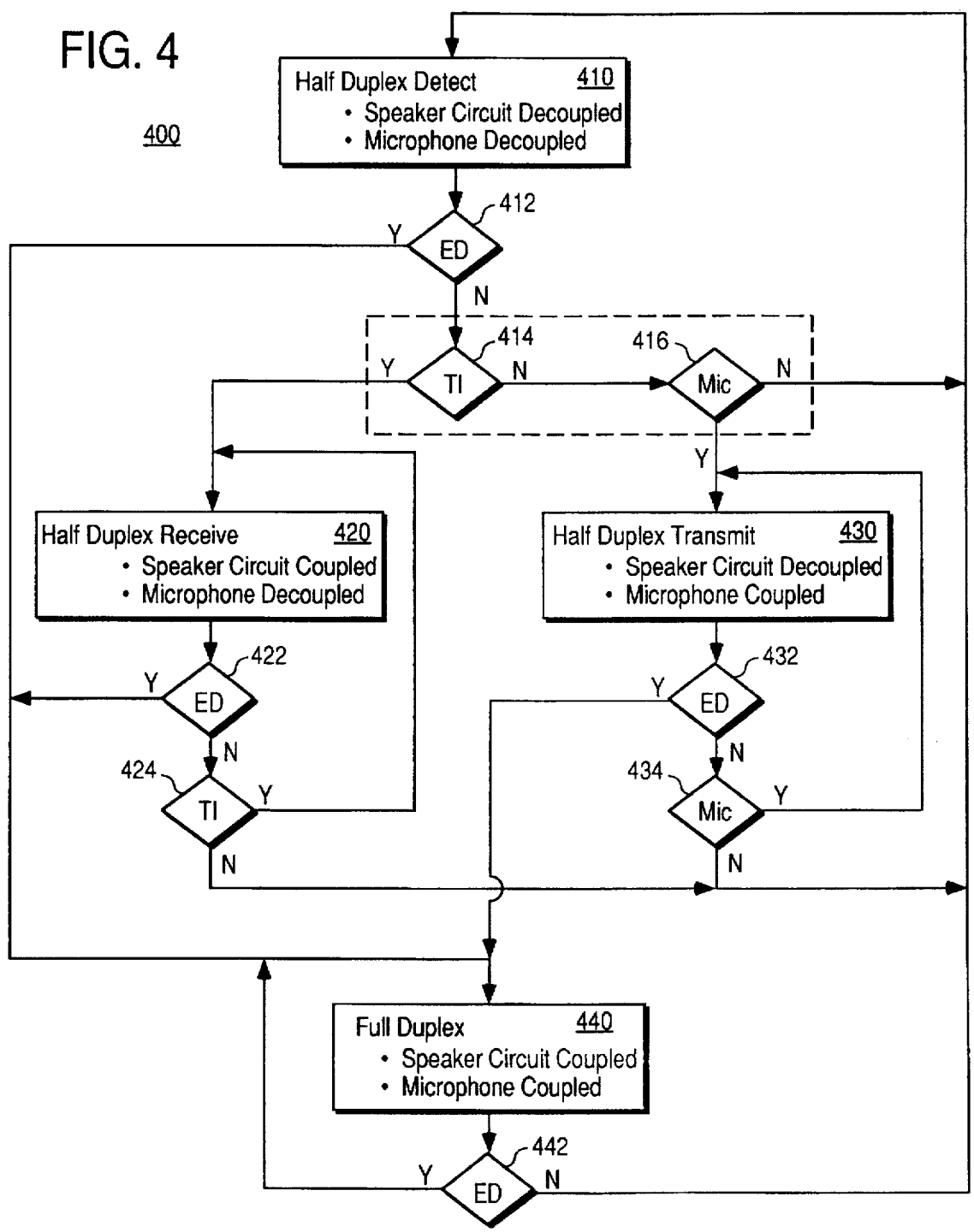
FIG. 4 illustrates a state diagram of the present invention.

FIG. 4 depicts an exemplary state diagram 400 of the operating states of the speaker telephone. These operating states are established by a controller (e.g., controller 250 of FIG. 2, or controller 350 of FIG. 3) in response to signals detected from the microphone, the telephone line terminal, and the earphone detector. While in the full-duplex operating state 440, the speaker telephone is in full-duplex mode. In each of the other operating states 410, 420, 430 depicted, the speaker telephone is in half-duplex mode.

In the half-duplex detect state 410, the telephone line terminal is decoupled from the microphone and the speaker circuit, and the controller repeatedly performs the steps of checking for an earphone connection or input (earphone detect) 412 from the microphone (microphone input 416 or telephone line terminal (telephone line terminal input) 414. If there is no earphone connection, the speaker telephone remains in the half-duplex detect state 410 until input from either the microphone or telephone line terminal is detected. If input from the telephone line terminal is detected 414, the speaker telephone transitions to the half-duplex receive state 420. If input from the microphone is detected 416, the speaker telephone transitions to the half-duplex transmit state 430. If an earphone is connected 412, the speaker telephone transitions to the full-duplex state 440.

In the half-duplex receive state 420, the telephone line terminal is coupled to the speaker circuit and decoupled from the microphone so that telephone reception via the speaker, but not telephone transmission via the microphone, is possible. While in the half-duplex receive state 420, the controller repeatedly performs the steps of checking for an earphone connection 422 and checking for input from the telephone line terminal 424. If an earphone connection is detected 422, the speaker telephone transitions to the full-duplex operating state 440. If input from the telephone line terminal ceases 424, the speaker telephone transitions to the half-duplex detect state 410 discussed above.

In the half-duplex transmit state 430, the telephone line terminal is coupled to the microphone and decoupled from the speaker circuit so that telephone transmission via the microphone, but not telephone reception via the speaker, is possible. While in the half-duplex transmit state 430, the controller repeatedly performs the steps of checking for an earphone connection 432 and checking for input from the microphone 434. If an earphone connection is detected 432, the speaker telephone transitions to the full-duplex operating state 440. If input from the microphone ceases 434, the speaker telephone transitions to the half-duplex detect state 410 discussed above.

In the full-duplex state 440, the telephone line terminal is coupled to both the microphone and the speaker circuit, thereby enabling simultaneous telephone transmission via the microphone and reception via the earphone. If an earphone disconnection is detected 442, the speaker telephone transitions to the half-duplex detect state 410.

It will be appreciated that their are several possible variations on the state diagram 400 described above. For example, when the speaker telephone is in the half-duplex transmit state 430, the controller could perform the additional step of checking for input from the telephone line terminal and causing the speaker telephone to transition directly to the half-duplex receive state 420 (i.e., without first returning to the half-duplex detect state 410) upon detecting input from the telephone line terminal and cessation of input from the microphone. Conversely, the speaker telephone could transition directly from the half-duplex receive state 420 to the half-duplex transmit state 430 upon detecting input from the microphone and cessation of input from the telephone line terminal. Moreover, when in the full-duplex state 440, the controller could perform the additional steps of checking for input from the microphone and telephone line terminal. The speaker telephone could then transition directly from the full-duplex state 440 to the half-duplex receive state 420 or the half-duplex transmit state 430 upon detecting earphone disconnection and either telephone line terminal input or microphone input, respectively.

It will further be appreciated that a controller may determine the status of inputs in a number of ways, including either periodically sampling the inputs (polling) or by responding to interrupts issued to a processor within the controller (interrupt processing). Herein the terms "checking" and "monitoring" are to be construed to encompass input status determination generally, including both input polling and interrupt processing.

In order to perform the steps of determining input status, determining operating state and coupling and decoupling signal paths in accordance the operating state, the controller may include a general purpose processor programmed with instructions that cause the processor to perform the recited steps, specific hardware components that contain hard-wired logic for performing the recited steps, or any combination of programmed general purpose computer components and custom hardware components. Nothing disclosed herein should be construed as limiting the present invention to a single embodiment wherein the retired steps are performed by a specific combination of hardware components.

A method and apparatus for operating a speaker telephone in both full-duplex mode and half-duplex mode are thus described. While the present invention has been described in particular embodiments and through particular examples, the present invention should not be construed as limited by such embodiments and examples, but rather construed according to the following claims.

What is claimed is:

1. A method for operating a speaker telephone comprising a speaker, a microphone and an earphone jack, the method comprising the steps of:

operating the telephone in a half-duplex mode wherein signals received from a telephone line are output by the speaker;

detecting connection of an earphone to the earphone jack;

in response to detecting connection of the earphone, transitioning from the half-duplex mode to a full-duplex mode wherein signals input via the microphone are transmitted on the telephone line and signals received from the telephone line are output by the earphone;

detecting disconnection of the earphone; and transitioning from the full-duplex mode to the half-duplex mode in response to detecting disconnection of the earphone.

2. The method of claim 1 wherein said step of transitioning to a full-duplex mode comprises the steps of:

coupling the microphone to a telephone line terminal, the telephone line terminal being coupled to the telephone line; and coupling the earphone jack to the telephone line terminal.

3. The method of claim 1 wherein said step of transitioning to a half-duplex mode comprises the steps of:

selectively coupling the microphone to a telephone line terminal, the telephone line terminal being coupled to the telephone line; and selectively coupling the speaker to the telephone line terminal such that only the microphone input or only the speaker is coupled to the telephone line terminal at any one time.

4. The method of claim 3 wherein said step of transitioning to a half-duplex mode further comprises the steps of:

monitoring the telephone line terminal and the microphone to detect signals received thereon;

transitioning to a half-duplex receive state in response to a signal received on the telephone line terminal; and transitioning to a half-duplex transmit state in response to a signal received on the microphone.

5. The method of claim 4 wherein said step of transitioning to a half-duplex receive state comprises the steps of:

coupling the telephone line terminal to the speaker to enable speaker output of the signal detected on the telephone line terminal; and decoupling the telephone line terminal from the speaker upon detecting cessation of the signal on the telephone line terminal.

6. The method of claim 4 wherein said step of transitioning to a half-duplex transmit state comprises the steps of:

coupling the microphone to the telephone line terminal to enable telephone transmission of the signal on the microphone;

decoupling the microphone from the telephone line terminal upon detecting cessation of the signal on the microphone.

7. A speaker telephone comprising:

a telephone line terminal for receiving a telephone line;

a microphone selectively coupled to said telephone line terminal;

a speaker circuit selectively coupled to said telephone line terminal, said speaker circuit including a first speaker and a jack for receiving a second speaker;

a detector configured to detect connection of the second speaker to the jack;

a controller coupled to said telephone line terminal, microphone, speaker circuit and detector, said controller being configured to monitor said detector to determine whether the second speaker is connected to the jack;

couple said telephone line terminal to said speaker circuit and to said microphone if the second speaker is connected to the jack;

monitor said telephone line terminal to detect incoming signals from the telephone line;

couple said telephone line terminal to said speaker circuit and decouple said telephone line terminal from said microphone if the second speaker is not connected to the jack and incoming signals from the telephone line are detected at said telephone line terminal;

monitor said microphone to detect input signals therefrom;

decouple said telephone line terminal from said speaker circuit and couple said telephone line terminal to said microphone if the second speaker is disconnected from the jack and input signals from said microphone are detected.

8. The speaker telephone of claim 7 further comprising a switch operated by said controller and coupled between said telephone line terminal and said speaker circuit, and wherein said controller couples said telephone line terminal to said speaker circuit by setting said switch to a first state, decouples said telephone line terminal from said speaker circuit by setting said switch to a second state.

9. The speaker telephone of claim 7 further comprising a switch operated by said controller and coupled between said telephone line terminal and said microphone, and wherein said controller couples said telephone line terminal to said microphone by setting said switch to a first state, decouples said telephone line terminal from said microphone by setting said switch to a second state.

10. The speaker telephone of claim 7 wherein said controller is configured to couple said telephone line terminal to said speaker circuit by receiving signals from said telephone line terminal and outputting received signals to said speaker circuit.

11. The speaker telephone of claim 7 wherein said controller is configured to couple said telephone line terminal to said microphone by receiving signals from said microphone and outputting received signals to said telephone line terminal.

* * * * *